(12) United States Patent
DeWaard et al.

(10) Patent No.: US 10,793,483 B2
(45) Date of Patent: Oct. 6, 2020

(54) METHOD AND SYSTEM FOR COMPOUNDING FERTILIZER FROM MANURE WITHOUT NUTRIENT EMISSION

(71) Applicant: DariTech, Inc., Lyndan, WA (US)

(72) Inventors: David DeWaard, Lyndan, WA (US); Josh McCort, Lynden, WA (US); Michael Klapper, Lynden, WA (US)

(73) Assignee: Dari-Tech, Inc., Lynden, WA (US)

( * ) Notice: Subject to any disclaimer, the term of this patent is extended or adjusted under 35 U.S.C. 154(b) by 144 days.

(21) Appl. No.: 16/054,895

(22) Filed: Aug. 3, 2018

(65) Prior Publication Data

US 2019/0119177 A1 Apr. 25, 2019

Related U.S. Application Data

(63) Continuation-in-part of application No. 15/792,442, filed on Oct. 24, 2017, now Pat. No. 10,683,239.

(51) Int. Cl.
*C05F 3/00* (2006.01)
*C05F 17/00* (2020.01)
(Continued)

(52) U.S. Cl.
CPC .............. *C05F 3/06* (2013.01); *B01D 1/289* (2013.01); *B01D 1/2881* (2013.01); *B01D 5/006* (2013.01); *B01D 19/0005* (2013.01); *B01D 21/262* (2013.01); *C02F 9/00* (2013.01); *C05C 3/00* (2013.01); *C05F 3/00* (2013.01); *C05F 17/00* (2013.01); *A01C 3/00* (2013.01); *C02F 1/041* (2013.01); *C02F 1/048* (2013.01); *C02F 1/20* (2013.01); *C02F 1/385* (2013.01); *C02F 11/04* (2013.01); *C02F 2101/16* (2013.01); *C02F 2103/20* (2013.01)

(58) Field of Classification Search
None
See application file for complete search history.

(56) References Cited

U.S. PATENT DOCUMENTS 2,951,755 A 9/1960 Joffe
4,292,328 A * 9/1981 Coulthard ............... C12N 1/20
426/2

(Continued)

FOREIGN PATENT DOCUMENTS

EP 0498084 * 8/1992 ............... C05F 3/00
EP 0498084 A1 8/1992

*Primary Examiner* — Wayne A Langel
(74) *Attorney, Agent, or Firm* — Williams Kastner & Gibbs PLLC; Mark Lawrence Lorbiecki (57) ABSTRACT

A system and method for reclaiming nutrients from dairy manure includes a centrifuge for separating a liquid fraction of the manure from a solid fraction comprising organic material; a mechanical vapor recompression evaporator ("MVR") to receive the liquid fraction from the centrifuge and evaporating the liquid fraction by mechanical vapor recompression to produce ammonia-laden water vapor and a concentrated nutrient slurry; a dryer for drying the nutrient slurry to a selected moisture content to be available as an ingredient in compounded fertilizer; and an ammonia stripping tower assembly to receive ammonia-laden water vapor from the MVR and from it to precipitate ammonium sulphate salt and condense water as separate products.

19 Claims, 2 Drawing Sheets

(51) Int. Cl.

| | |
|---|---|
| *C05F 3/06* | (2006.01) |
| *C05C 3/00* | (2006.01) |
| *B01D 21/26* | (2006.01) |
| *B01D 19/00* | (2006.01) |
| *B01D 1/28* | (2006.01) |
| *B01D 5/00* | (2006.01) |
| *C02F 9/00* | (2006.01) |
| *C02F 1/20* | (2006.01) |
| *C02F 1/38* | (2006.01) |
| *A01C 3/00* | (2006.01) |
| *C02F 1/04* | (2006.01) |
| *C02F 101/16* | (2006.01) |
| *C02F 103/20* | (2006.01) |
| *C02F 11/04* | (2006.01) |

(56) References Cited

U.S. PATENT DOCUMENTS

| | | | |
|---|---|---|---|
| 4,411,682 A * | 10/1983 | Brill | C05F 17/00 |
| | | | 71/9 |
| 4,668,250 A | 5/1987 | Drese | |
| 5,593,590 A | 1/1997 | Steyskal | |
| 5,810,975 A | 9/1998 | Bourdel | |
| 5,928,412 A | 7/1999 | Bastholm | |
| 6,368,849 B1 | 4/2002 | Norddahl | |
| 6,513,580 B1 | 2/2003 | Bourdel | |
| 6,623,546 B1 | 9/2003 | Bourdel | |
| 9,962,623 B2 | 5/2018 | Zaher | |
| 2002/0158024 A1* | 10/2002 | Van Slyke | C05F 3/00 |
| | | | 210/696 |
| 2003/0057160 A1 | 3/2003 | Williams | |
| 2010/0319423 A1* | 12/2010 | Thomsen | C05F 3/00 |
| | | | 71/21 |
| 2012/0074058 A1 | 3/2012 | Zeng | |
| 2013/0105398 A1 | 5/2013 | Wennergreen | |
| 2013/0344558 A1* | 12/2013 | Green | C05F 17/964 |
| | | | 435/170 |
| 2014/0083919 A1 | 3/2014 | Li | |
| 2014/0311889 A1 | 10/2014 | Zaher | |
| 2015/0299056 A1 | 10/2015 | Ingels | |
| 2016/0002131 A1 | 1/2016 | Glasspool | |
| 2016/0037781 A1* | 2/2016 | Hashman | A23K 10/12 |
| | | | 800/298 |
| 2016/0102026 A1 | 4/2016 | Hulls | |
| 2016/0176768 A1 | 6/2016 | Norddahl | |
| 2017/0073598 A1 | 3/2017 | Heimann | |

* cited by examiner

METHOD AND SYSTEM FOR COMPOUNDING FERTILIZER FROM MANURE WITHOUT NUTRIENT EMISSION

PRIORITY CLAIM

This application is a continuation-in-part of Ser. No. 15/792,442 dated 24 Oct. 2017 and entitled "METHOD AND SYSTEM FOR COMPOUNDING FERTILIZER FROM MANURE WITHOUT NUTRIENT EMISSION" placed on file by the instant inventors; the whole of which is incorporated herein, as if fully set forth, by this reference.

FIELD OF THE INVENTION

The invention resides in the field of manure management more specifically in the compounding of manure constituents to manufacture fertilizer.

BACKGROUND OF THE INVENTION

Application of manure as a fertilizer for crop production is the primary accepted mechanism for disposal of manure from animal feeding operations. Efficient use of manure as a fertilizer is complicated by the proportions of nutrients in manure, variability in many sources of manure, and difficulties in estimating nutrient availability. A relatively low nutrient concentration naturally occurring in dairy manure limits the distance that manure can profitably be transported for use as a fertilizer. Manure management is most likely to be profitable on farms with a manure source with a relatively high nutrient concentration (like slurry manure) applying manure to fields near the operation and to a crop or crop rotation that can fully use all the applied nutrients.

There are thirteen known mineral elements which plants absorb through their leaf and root systems providing all the nutrients needed for health and growth. The mineral nutrients are divided into two groups: macro nutrients and micro nutrients.

The three major macro nutrients that most people are familiar with are nitrogen (N), phosphorus (P) and potassium (K). The standard labeling always lists these three essential nutrients in this order because they are recognizes as the three main contributors to plant nutrition for growing green leaves, making seed and fruit, and growing cells. Fertilizers are often described by the ratio by which principle nutrients are contained. The N-P-K ratio is the percentage the fertilizer contains by volume of each of nitrogen (chemical symbol N), phosphorus (P), and potassium (K). A 16-16-16 fertilizer, for example, contains 16% nitrogen, 16% phosphorus, and 16% potassium. A 25-4-2 formulation contains 25% nitrogen, 4% phosphorus, and 2% potassium.

A fertilizer containing all three major macro nutrients is called a complete fertilizer; a product that supplies only one or two of them is an incomplete fertilizer. A complete fertilizer for every agricultural purpose seems sensible, but in fact it isn't always the best choice. If the soil contains sufficient phosphorus and potassium and is deficient only in nitrogen (as is often the case), the farmer will save money and prevent what are excess nutrients from entering the aquifer as runoff. By using an incomplete fertilizer that provides nitrogen alone (such as ammonium sulfate, discussed below, for example), specific amendment to soil can assure optimum conditions for crop growth.

The various products labeled "general-purpose fertilizers" contain either equal amounts of each major nutrient (N-P-K ratio 12-12-12, for example) or a slightly higher percentage of nitrogen than of phosphorus and potassium (such as a 12-8-6 product). Such fertilizers are intended to meet most crops' general requirements throughout the growing season. Special-purpose fertilizers, on the other hand, are formulated to meet specific needs. For farmers needing to enhance the soil in a specific manner or to produce a certain effect on a crop, a particular combination of nitrogen, phosphorus, and potassium may be necessary.

Nitrogen (N) mainly affects vegetative growth and general health. Chlorophyll, the green substance in plants responsible for photosynthesis, is largely composed of nitrogen. It is also used heavily in new shoots, buds and leaves. Air contains about 78% nitrogen, but atmospheric nitrogen is not readily available to plants. They must absorb it through the soil. Nitrogen is necessary for aboveground growth of plants; it is considered one of the most important plant nutrients. Nitrogen is used to make proteins that build cell material and plant tissue, promoting growth of the stems and leaves which is especially important for leaf crops such as cabbage, lettuce and spinach. In addition, nitrogen is chemically linked to the function of other essential biochemical agents such as those in photosynthesis, as well as those enzymes that help plants assimilate nutrients and to form nucleic acids which are involved in the healthy development of fruit flowers and seeds. Of all the major plant nutrients, the presence of nitrogen is often the most important driving factor in plant growth and crop yield.

Phosphorus (P) helps plants transport and assimilate nutrients, it is a major building block in all living plants. It is responsible for the storage of energy. The energy stored allows for the transportation of nutrients across the cell walls of the plant. Good plant phosphorus levels ensure that crops will reach their full potential for healthy development of fruit flowers and seeds. Phosphorus helps to build plant vitality and is of special importance in the processes concerned in the development of the strong root systems that ensures better resistant to root rot diseases.

Potassium (K), sometimes known as potash, is important for general health of plants. Potassium has many functions: It guards the plant against diseases and aids in drought protection and cold tolerance. It also serves a role in improving root development and helps in the process of photosynthesis. Potassium enables plants to develop strong, thick stems, healthy roots and large, plentiful fruit. Plants require larger quantities of potassium than any other nutrient. Potassium is associated with movement and retention of water, nutrients, and carbohydrates in plant tissue. Potassium is a key nutrient in the plants tolerance to stresses such as cold-hot temperatures, improves resistance to pests and diseases and is essential for the development of fruits flowers and seeds. A farmer might consider using a high-potassium fertilizer at the start of winter and summer to protect crops from temperature extremes or when insects and disease have caused damage to crops.

A good fertilizer will contain other macronutrients as well. These are calcium (Ca), magnesium (Mg), and sulfur (S). The amount of calcium and magnesium present usually depends on the amount and type of lime present or added to the soil. Sulfur is usually found in sufficient quantities in soils containing good amounts of organic matter. Along with the macro nutrients there are a number of micro nutrients that plants need, either directly or indirectly, for healthy growth. These elements, sometimes called trace elements, are only needed in very small quantities, they are boron (B), copper (Cu), iron (Fe), chloride (Cl), manganese (Mn), molybdenum (Mo) and zinc (Zn). Given the feeding options in most dairies, these secondary macronutrients and micronutrients are naturally present in dairy manure.

Research has shown that disposal applications of manure for crop production greatly increase the potential for polluting ground water with excess nutrients. Movement of nutrients from agricultural land to water resources is a complex process controlled by many factors. Nutrients can leach through the soil profile into ground water or reemerge as seeps, springs or from tile drains to enter surface waters. Runoff can carry nutrients as dissolved ions and in particulate matter. It stands to reason that any nutrient applied in excess of the crop's ability to effectively use that nutrient, remains available to ultimately arrive in the aquifer.

Yet, there exist more than ample crop capacity to dispose and exploit all excess nutrients found in dairy manure and thereby to replace some of synthetic fertilizer in conventional farming. In 1997, 24.7 billion tons of nitrogen and 4.06 billion tons of phosphorus were purchased as fertilizer. A Natural Resource Conservation Service (NRCS) study estimated confined livestock in the US generated 2.58 billion pounds of nitrogen and 1.44 billion pounds of phosphorus available for land application in the same year (<15% of purchased nitrogen and phosphorus). The NRCS study concluded that the manure nutrients available were present in volumes that exceeded by over 60% the nutrient needs of crops on the farms where they were produced. The same report indicated that at least 165 US counties were likely to have difficulties using all manure nitrogen generated within the county and 364 counties would have trouble using all the manure phosphorus generated in the county. This implies that, in many instances, efficient use of manure as a fertilizer will require transporting the excess manure nutrients to where they are needed and applying them to fields that are not owned by the farmer whose herd generated the manure. Thus, a manure-based fertilizer must be portable to prevent fouling fields with excess nutrients.

The value of manure as a fertilizer source has been recognized for thousands of years. However in modern agricultural systems manure sources often are underused as fertilizer resources for crop production. This is directly due to physical and chemical characteristics of unprocessed manure that reduce its value as a fertilizer compared to other fertilizer sources commonly used by crop producers. Natural unprocessed manure has the following liabilities as a fertilizer:

Nutrient concentration: Total fertilizer nutrient concentration rarely exceeds 10% in most manure sources and frequently is a fraction of that. For example nitrogen, phosphate and potash are approximately 8.5% of the weight of poultry litter, 1.5% of the weight of hog slurry and 0.2% of the weight of hog lagoon effluent. Most commercial grade fertilizers exceed 30% nutrient concentration by weight. Low nutrient concentration increases the time and cost of transportation and land application.

Nutrient ratio: Modern fertilizer production practices allow the blending of fertilizer constituents providing custom fertilizers that meet the specific nutrient requirements of a crop and field. Manure nutrient ratios are a product of animal nutritional considerations and manure storage and frequently do not match the crop requirements. For example applying poultry litter to meet the nitrogen needs of a corn crop applies over five times more phosphate than the crop removes in the grain. It has been clearly documented that long-term use of unbalanced manure fertilizers leads to high soil test phosphorus and potassium levels.

Nutrient availability: Most commercial fertilizers are designed to be rapidly available to crops when applied to the soil. The organic nitrogen fraction of manure reduces the availability and predictability of the manure as a nitrogen source because the availability of organic nutrients are dependent on microbial activity in the soil. The chemistry of manure makes inorganic nitrogen in manure prone to volatilization losses when it is surface applied. Successful use of manure fertilizer requires adjusting application rates to account for reduced nutrient availability. Sometimes manure management strategies can take advantage of the slow release characteristics of organic nitrogen and phosphorus in manure to help reduce nutrient losses from fertilizer applications.

Uniformity: Most states have legal requirements for guaranteed analysis of products sold as commercial fertilizers. Nutrient concentrations in manure typically vary spatially and over time within the manure storage making it difficult to meet fertilizer law requirements. Farmers also are challenged when calculating application rates of highly variable sources of manure. Should they apply a rate that on average supplies the target fertilizer rate or select a rate that guarantees the whole field gets at least the target fertilizer rate? The first strategy insures portions of the field will have nutrient deficits, an economic liability to the farmer; the second strategy maximizes yield but also insures that part of the field will have nutrient excess, a water quality liability.

Timing: Manure may have to be applied at times that are not ideal for maximizing availability of nutrients. This is especially true for manure storages with an inflexible cleanout schedule such as liquid manure from storages with less than one-year capacity. Manure application decisions are frequently driven by the need to empty a manure storage structure to reduce the risk of overflow or to meet animal management concerns, not to meet crop fertilization requirements.

To understand these liabilities, one must also understand what are the four inherent components of raw unprocessed manure whose natures contribute to cause these several liabilities; if processing the manure can alter the presence or proportion of each of these components, the resulting manure product will minimize or eliminate the shortcomings of raw manure set forth above. The components are:

Water. Water is a diluent lowering concentrations of nutrients overall and is both heavy and bulky to transport;

Low nutrient vegetable fiber. A large proportion of manure is nonnutritive organic matter (organic solids) that might be useful for other purposes but will expand volume while not significantly enhancing the nutritive viability of soil upon application.

Nitrogen. Nitrogen is generally water-borne within manure.

Phosphorus. Phosphorus is also both carried in solution and as water-borne solids within manure and difficult to separate other than by means that drive off the nitrogen; as such, it is very difficult to apply in any but its native proportion as it occurs relative to nitrogen when each are present in the manure.

What is needed in the art of compounding fertilizer from manure is a means to remove water from manure without removing its nutrient components of phosphorus and nitrogen; a means of distinctly supplementing nitrogen in the resulting fertilizer without simultaneously raising phosphorus levels therein; and a means of removing excess organic solids from manure to assure a more efficacious fertilizer results from processing manure.

SUMMARY OF THE INVENTION

To produce fertilizer, a system and method extracts a nutrient rich liquid concentrate and removing, in a centrifuge, nonnutritive organic matter present in manure to form a manure slurry. The system and method each concentrate the resulting manure slurry in a mechanical vapor recompression evaporator ("MVR") having a heat exchanger. The MVR is an evaporator which exploits heat present in the manure slurry to drive off water as a vapor. The MVR receives the manure slurry within a chamber including a first side of a heat exchanger to evaporate ammonia laden-water vapor from the slurry, leaving a nutrient concentrate. A compressor concentrates energy in the evaporated ammonia-laden water vapor conveying that energy as heat through the first side of the heat exchanger. At a second side of the heat exchanger, the compressed water vapor conveys heat to the slurry through the second side of the heat exchanger. Ammonia-laden water vapor condenses at the second side of the heat exchanger which is cooled by contact with slurry on the first side of the heat exchanger. When the ammonia-laden water vapor is condensed at a process temperature, it is conveyed to an ammonia stripping tower where the ammonia-laden water is dispersed into ammonia-laden water droplets.

By sequential use of the centrifuge, the MVR, and the ammonia stripping towers, the method and system work to isolate the four components of manure discussed above which when present in the raw state, make manure less efficacious than synthetic fertilizer. The centrifuge removes the largely inert organic matter from the manure (which may, in proper proportion, be used as organic filler in the resulting fertilizer); the MVR removes the water component (meaning less expense in transit and easier storage in a lesser volume) as well as separating nitrogen from potassium held in the manure slurry. By so doing, both the potassium and the nitrogen can be recovered such that levels of each may be combined to yield a fertilizer having these nutrients in their most efficacious proportions for each specific application.

Conserving the energy present as heat in the condensate as it leaves the MVR allows the ammonia stripping tower to function with a minimal expenditure of further energy. Put another way, the high heat of the compressed vapor condensate makes stripping of the ammonia easier because the droplets of condensate remain heated due to change of phase from steam. Condensate comprising ammonia-laden water vapor leaves the MVR at a selected process temperature, the temperature being selected to encourage the liberation of ammonia gas from this vapor leaving only nearly pure water suitable for reuse in the dairy.

In a similar manner, a further synergy is realized in the use of the centrifuge to initially concentrate the manure slurry thereby to remove sand and organic matter that is not nutrient-laden or useful as fertilizer from the MVR feedstock. By removing abrasive sand and fibrous organic matter the MVR feedstock neither requires additional energy to separate vapor from the slurry nor does the feedstock cause excess wear to the MVR. So, the using the three devices in sequence (centrifuge to MVR, MVR to ammonia stripping) presents a Tinker to Evers to Chance sort of double play in the breakdown of manure to useable fertilizer building blocks. This synergy is unexpected as generally the functions of the MVR and centrifuge are thought to be redundant one to another as both the centrifuge and MVR are generally used as dewatering devices.

Using the centrifuge in conjunction with the MVR is not conventional as each are generally used as dewatering devices alone. Each alone are generally exploited to desiccate the product passed through them. Placed sequentially, as in the instant system, the two are uniquely configured to facilitate the capture and precipitation of the volatile nitrogen as ammonium sulfate, while separately collecting the nonvolatile nutrients. Using the centrifuge, then the MVR and the ammonia stripping tower allows the efficient separation of the four components of the manure, discussed above, into variously useful products, each having their own value.

Nitrogen, while very valuable, is also easily lost to volatilization by either time or heat. In conventional processing, nitrogen is often sacrificed to the ambient atmosphere as a pungent odor reminiscent of cat urine. Capturing that nitrogen from the ammonia gas preserves the environment and captures it in the valuable form of ammonium sulfate when it would otherwise remain diluted in the condensate from the MVR. A further efficiency arises from the specific configuration of the instant invention. Because the ammonia collection vessel 37 yield a distilled practically pure water which, after the ammonia content is removed, can be retained for reuse in the dairy. Because dairies consume great volumes of water and because water is not, in most instances, freely available any pure water recovered from urine enhances the profits on the dairy's bottom line.

Using the striping towers, from the ammonia-laden water vapor, nitrogen is precipitated as ammonium sulfate through the action of the stripping tower. Exploiting the heat from the MVR assures a greater yield of ammonium sulfate for resale as fertilizer with the less expenditure of supplemented energy. The ammonium sulfate contains all of the nitrogen from the manure. Ammonium sulfate can be used either as a stand-alone fertilizer or as the nitrogen component of a N-P-K fertilizer.

Also, because water is expensive to transport and readily available in agricultural settings, driving it out of the product prior to transport makes good economic sense. Drying the concentrated nutrients as they leave the MVR in the form of concentrated slurry yields a useful fertilizer or fertilizer component. Drying the slurry only after the removal of volatile nitrogen does little injury to the remaining nutrients in the nutrient concentrate ("slurry"), including those macro nutrients, phosphorus and potassium. And given the already low-moisture state of the manure slurry, it needs only to be subjected to a low-heat drying to drive off what little water remains in the slurry or nutrient concentrate. What emerges then is a fertilizer product that is potent and can be classed as "organic."

Because recovered nitrogen can be selectively added to the dried slurry, it is possible to adjust levels of nitrogen relative to the remaining nutrients to produce fertilizer in accord with a desired make up. No excess nutrients escape to the environment, and in their recovered form, both the ammonium sulphate and the dried nutrient slurry has economic value. The resulting fertilizers provide optimally bioavailable nitrogen and other macro and micro nutrients to enhance soil. Because excess water and non-nutritive organic solids have been removed, the resulting fertilizer is properly balanced, dry and lightweight, suitably potent, and readily broadcast onto fields without fear of nutrient run off. In toto, the method and system, separates manure into constituent nutrient and organic fractions and, then, compounds the nutrients and organic solids in selected proportions from processed into efficacious fertilizer.

BRIEF DESCRIPTION OF THE DRAWINGS

Preferred and alternative examples of the present invention are described in detail below with reference to the following drawings.

DETAILED DESCRIPTION OF THE PREFERRED EMBODIMENT

Figure 1:
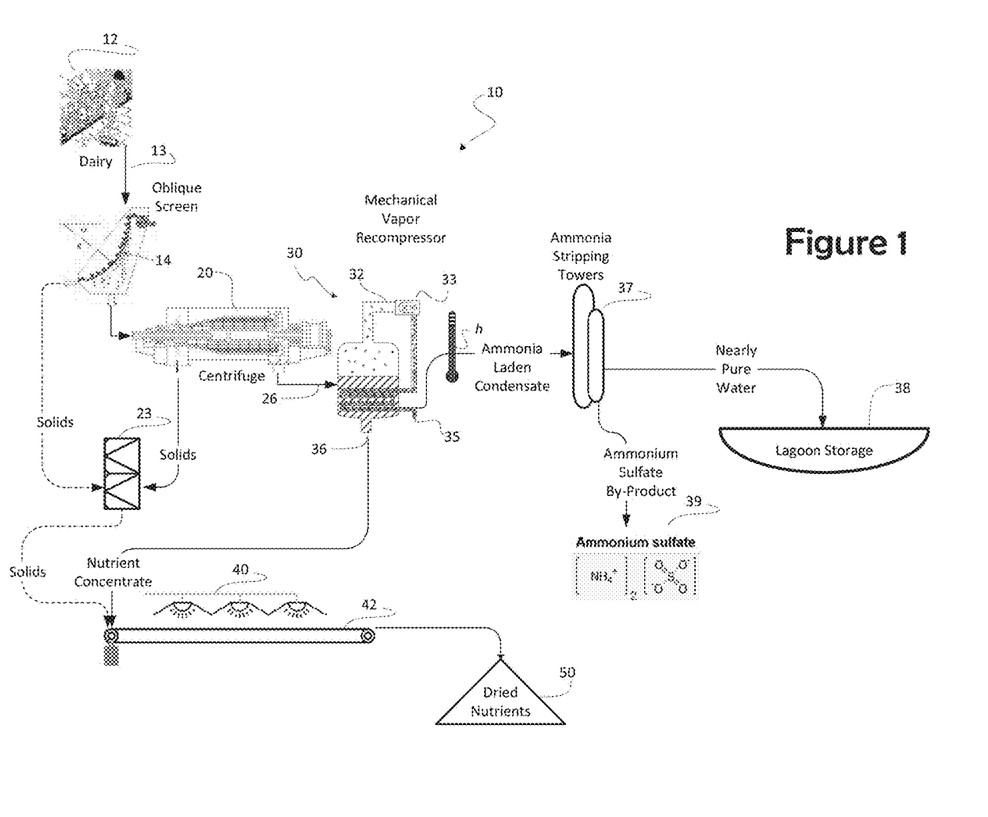
FIG. 1 depicts a dairy serviced by the inventive system for collecting and processing manure.

A preferred embodiment of the invention is depicted in FIG. 1. A system 10 for extracting nutrients from raw manure received from a dairy 12 is depicted as comprising an optional primary separator 14, a centrifuge 20, and a mechanical vapor recompression evaporator ("MVR 30") operated in conjunction with an ammonia collection vessel 37. The condensate from the MVR 30 feeds an ammonia concentrating stack in the preferred embodiment (referred to herein collectively as ammonia collection vessel 37). In the preferred embodiment, collected nutrient concentrate and reclaimed solids 23 and are suitably blended, compounded, and dried to produce a variety of valuable fertilizers. Dried and concentrated, as expounded herein, the product the method and system produces is as easily transported as synthetic fertilizers and applied to agricultural fields with equal or better effect.

Manure is the other product of any dairy 12. To give a very rough scale of manure production, typical dairy animals produce about 1.61 ft$^3$ (12.0 gallons) of fresh manure (feces and urine) per 1,000 lb. according to their average live weight per day. In one way or another, the dairyman has paid for each of the nutrients manure contains at the time of feeding the cows. As such, the recovery of these nutrients can only serve to make the dairy more efficient. Preventing release of these same nutrients to the environment prevents the pollution of the ground water.

Parenthetically, the inventors note, in a modern dairy, manure is moved by employing high volume manure pumps. Flow through these pumps is selected to occur at a flow rate adequate to prevent settling of manure solids as the manure is transported. While pumps are not portrayed in these FIGS. 1-3, the presence of those pumps is presumed. Because the movement of pumped manure within a dairy is well-known, depicting individual pumps is not necessary to convey an understanding of the invention. Pumps are not shown but their presence is presumed. Where conduits between elements of the system are portrayed, pumps might be employed to assure the movement of manure through those conduits in actual operation.

The source of manure on a dairy farm is, of course, the cows. Manure contains important nutrients for plant growth, most notably nitrogen ("N"), phosphorus ("P"), and potassium ("K"). Roughly half of excreted nitrogen is in feces and half is in urine. Urine nitrogen is especially subject to rapid volatilization loss when urea in the urine is enzymatically hydrolyzed to ammonia ($NH_3$). But, from the moment of excretion, nitrogen begins to leave the manure as ammonia and changes the ratio between it and other macronutrients.

Dairy manure is relatively rich in phosphorus. Because it is less volatile phosphorus will accumulate in the soil while nitrogen escapes. The N:P ratio for excreted manure after any $NH_3$ volatilization results fertilizer having a lower N:P ratio than is found in harvested crop material. Because of this imbalance, retaining greater amounts of nitrogen is important in manufacturing fertilizer. Conventionally, to capture more of the economic value of manure phosphorus as a fertilizer, farmers who do apply manure will also seek make up the nitrogen shortage with commercial nitrogen fertilizer such as ammonium sulphate salt.

Phosphorus is an essential element classified as a macronutrient because of the relatively large amounts of phosphorus required by plants. One of the main roles of phosphorus in living organisms is in the transfer of energy. Phosphorus plays a role in photosynthesis, respiration, energy storage and transfer, cell division, cell enlargement and several other processes in plants. Organic compounds that contain phosphorus are used as vehicles to transfer energy from one reaction and thereby to drive another reaction within cells. Adequate phosphorus availability for plants stimulates early plant growth and hastens maturity.

Phosphorus is fed to the animals via plants, but may also occur as feed additives in the form of inorganic phosphate. Phosphorus is a vital component of DNA, the genetic "memory unit" of all living things. It is also a component of RNA, the compound that reads the DNA genetic code to build proteins and other compounds essential for plant structure, seed yield and genetic transfer. The structures of both DNA and RNA are linked together by phosphorus bonds. Cattle are able to use phosphorus very efficiently and only the plant phosphorus that is not mobilized and adsorbed in the digestive system is excreted in feces and very little in urine.

In the production of synthetic fertilizer, the value of manure organic matter (organic carbon) as a soil amendment is overlooked but the role such organics play in improving soil tilth is well established. Organic C content of manures is about fifteen percent of the dry weight of manure. In a study of manure from 11 dairies in the Central Valley of California the make up of manure is shown to be:

| Property | Unit | Median | Minimum | Maximum |
| --- | --- | --- | --- | --- |
| Moisture content | % wet wt. | 68 | 1 | 83 |
| Volatile solids | % dry wt. | 72 | 35 | 89 |
| Total carbon | % dry wt. | 35.6 | 18.1 | 43.9 |
| Total N | % dry wt. | 2.1 | 1.2 | 3.5 |
| C:N | — | 16.1 | 9.3 | 33.4 |
| $NH_4$—N | mg/kg dry wt. | 1346 | 13 | 6282 |
| $NO_3$—N | mg/kg dry wt. | 9 | <1 | 312 |
| Total P | % dry wt. | 0.41 | 0.18 | 1.99 |
| Total K | % dry wt. | 0.57 | 0.15 | 4.37 |
| pH (sat'd paste) | — | 7.8 | 6.6 | 9.0 |
| EC (sat'd paste extract) | mS/cm | 4.1 | 1.7 | 36 |

Manure contains a great deal of water as collected. Not only is it present when the cows excrete it, but operation of the dairy increases the water in collected manure. As stated above, water is an essential tool in the dairy. In addition to providing water volume to the produced milk and keeping the herd healthy and hydrated, water is used for cleaning the dairy interior. The volume of a manure stream 13 collected from the dairy 12 is enlarged by various liquids such as water wastage, milking center waste water, water used to clean floors, and "flushing" of alleys. The concrete floors of conventional dairies are generally engineered with enough of a slope to permit the use of water propelled by gravity to move manure, a procedure known as flushing.

The amount of water used for flushing per cow will vary widely, depending on the size and design of facilities and the frequency of flushing, and because of differences in design, the necessary amount of water will need to be individually calculated for each dairy. Generally, a "flush" of about 10,000 gallons is needed to clean an alley width of 10 to 16 feet. If four alleys are common for every 400 cows, and the alleys are flushed twice daily, this would be an average use of 200 gal./cow/day. Many dairies use more than two flushes per day. But water is not free, nor is the disposal of waste water. Understanding these volumes, one can readily appreciate the value of reclaiming some if not most of the flushing water as well as water present in native manure. The inventive method and system has the advantage of producing nearly drinking-quality water as a by-product.

Because manure flushed from the floor of the dairy 12, collected as the manure stream 13, is a mixture of feces and urine, bedding material (e.g. straw, wood shavings, sawdust, sphagnum), spilt feed and drinking water, and water used for washing floors, getting the inert and macroscopic "inclusions" out of manure is generally favored in each of these preferred embodiments though use of a primary separator 14 is not strictly necessary. The inclusions are so much larger in size than those nutrient solids remaining in suspension within the manure stream 13, screens prove advantageous for a first removal mechanism or primary separator 14, and are often situated in the gutters themselves or at the gutter outlet to immediately remove these inclusions from the flow before any of the remaining smaller particulate matter is addressed. A screen may be, optionally, placed within a gutter to remove the solids from the manure that flows into the gutter. Another form of primary separator 14 is a screen positioned obliquely to a flow of the manure stream 13 such that debris within the flow is deflected out from the flow thereby exploiting its kinetic energy to ride the screen up and out of the flow. In most embodiments, the oblique screen is sufficient to remove these inclusions from the manure stream 13. However, there are other suitable screen configurations that may be selected from any of the family of screen separators (stationary, vibrating, and rotating screen separators).

The actual volume of the manure stream 13 that must be handled on a dairy is typically more than 1.61 ft³/average cow per day. Additional solids may be swept in from wasted feed, freestall bedding, and soil tracked in from outside lots. Additional water is often added from waterer wastage, milking center waste water, water used to clean floors, and flushing of alleys. None of this yields a better fertilizer. For example, cellulose such as that in straw, used for bedding, is not readily useful for amending soil as fertilizer. This cellulose contributes nothing to the fertilizer product but mass and volume and like that of the contained water diminishes the nutritive value of the resulting fertilizer. The removal of this inert solid particulate matter from the process assures that only high-value nutritive matter will be compounded into the fertilizer but also that the resulting fertilizer products are homogenous and uniformly effective and that each nutritive component of the compounded fertilizer contributes in a known quantity or proportion in a known manner. So, removal of all the inert matter without removing nutrients is a goal of the first necessary step, that of centrifugation of the manure stream 13.

The manure stream 13 includes a colloidal suspension of nutrients in solid phase as well as carrying nutrients in solution and especially susceptible to centrifugal separation. In manure, some of the nutrients reside as dispersed-phase particles having diameters between approximately 1 and 1000 nanometers. Such particles are normally easily visible in an optical microscope, although at the smaller size range (r<250 nm), an ultra-microscope or an electron microscope may be required. A colloid is a mixture in which one substance of microscopically dispersed insoluble particles is suspended throughout another substance. Unlike a solution, whose solute and solvent constitute only one phase, a colloid has a dispersed phase (the suspended particles) and a continuous phase (the medium of suspension). To qualify as a colloid, the mixture must be one that does not settle or would take a very long time to settle appreciably. Centrifugation is especially suited for this sorting of nutritive particles from inert solid particulate. Mechanical separation can distinguish most of the nutrients from the inert solids by density. Because the size of nutrient particles is much smaller and they tend to be less dense than the inert solids, the centrifuge can efficiently separate nutrients and the liquid fraction from the inert solids such as sand. By selection of rotational speed, the centrifuge's ability to distinguish inert particulate from nutritive particles can be optimized.

A centrifuge 20 is a device which employs a vessel spinning at a high rotational speed to separate components of different densities. The decanter is a type of centrifuge used for the separation of two or more phases of different specific gravity; in particular for the clarifying of liquids in which suspended solids are present. The separation of solids and liquids takes place within a cylindrical/conical rotating bowl, drawing the more dense organic solids through the heavy manure to accumulate on the periphery for removal from the resulting light manure. Where a centrifuge is used, the solid fraction retained through secondary separation 26 is highly compostable organic matter and is collected as reclaimed solids 23.

The centrifuge 20 works using the sedimentation principle, where the centrifugal acceleration causes denser substances and particles to move outward in the radial direction. At the same time, objects that are less dense are displaced and move to the center. The solids accumulate to form a resulting dry product that is often termed cake, and the liquid leaving a centrifuge after most of the solids have been removed is called centrate.

The two types of centrifuge separators are centrisieves and decanters. Centrisieves consist of an inclined revolving drum that is lined with a filter cloth. The slurry to be separated is pumped into the drum center. The liquid leaves the drum through the filter cloth and the solids move by centrifugal force to the edge of the drum where they are removed separately.

While the invention is not limited thereto, the preferred embodiment of the invention exploits a decanter centrifuge. Decanter centrifuges have a characteristic that dictates selection of an appropriate size. The spinning mass of the centrifuge 20 is its most notable feature. Great amounts of energy are expended to bring the centrifuge 20 up to its operating rotational speed. Frequent run and stop, deceleration with high inertia load, and overhauling torque tend to expend great amounts of energy and energy has a great cost. The optimally sized decanter is one that can process all of the manure produced in a twenty-four hour period in an interval of twenty-four hours. When a centrifuge 20 is idle, it is costly to return it to operation. In operation, the most efficient use of the centrifuge 20 requires it to be consistently and constantly running.

In the case of decanter centrifuges, an auger, turning at a slightly higher speed than the cylindrical vessel in which it is contained, moves the slurry to the conic part, where it is discharged. Centrifuges 20 are very effective at solids separation and can achieve relatively low moisture levels. The initial cost is high, however, and the energy requirement is also quite high in comparison to other systems. The decanter centrifuge, however, is considered as the workhorse of a wide range of liquid/solid separation activities. Its application to the dewatering of waste sledges has made it a most valuable tool in animal husbandry. The dewatered solids or cake is conveyed from the centrifuge and may be used as bedding, solids for compost, or for digestion or gasification to produce fuel.

A liquid fraction and a solid fraction emerge from the centrifuge 20. The solid fraction is, optionally, fed to a digester, as stated above, and the liquid fraction is fed to the MVR 30. Importantly, operation of the centrifuge 20 can determine the moisture of solid fraction emerging from the centrifuge 20. Remembering that moisture includes most nutrients, a drier solid fraction means that more of the nutrients remain in the liquid fraction or centrate 26.

The performance of a decanting centrifuge depends on factors such as the G-force, dewatering volume, and retention time. Remembering that centrifuges produce, by centrifugal forces a greater effect on particulate held in suspension in the manure than would gravity in a settling separation. The term G-force or G-value is frequently used to quantify the force acting on those solids: it is the multiple of the gravitational constant obtained in the centrifuge. The centrifugal acceleration or G-value will increase with drum diameter and speed. An operating range of between 1500 G to 2500 G is conventional in a decanter centrifuge. Experimentation has shown that the maximum effective separation occurs when G-values approach approximately 2200 G with a tolerance of ±200 G, thus producing the driest solid matter and the greatest volume of the liquid fraction per unit volume of manure.

Generally speaking, the more efficiently the centrifuge 20 dewaters the solids in the manure, the better condition is the liquid fraction presented to the MVR 30 evaporator. In general, good operational balance can be achieved when the solid fraction of reclaimed organic solids 23 represents between 15% and 50% of the volume originally fed to the centrifuge. The liquid fraction or centrate 26 fed to the MVR 30 represents the remaining volume of between 50% and 85%. The exact split is optimized to capture the nutrients in the centrate 26 to be fed to the MVR 30. Because the flow of the liquid fraction will, thus, have little other particulate matter entrained within, including fiber and other non-nutrient solids, the MVR 30 can operate more efficiently without the presence of abrasive particulate.

The removal of abrasive solids from MVR feedstock causes that feedstock to also have a lower viscosity than an unseparated manure feed. This lower viscosity requires less energy for pumping the feedstock into and urging movement within the MVR. Also, as the feedstock contains far fewer solids that might foul the capillaries of the heat exchanger in the MVR 30, the heat exchanger therein is more effective and will last longer in the face of constant use. The removal of non-nutrient solids has the additional benefit of improving the final nutrient (nitrogen, phosphorus, and potassium) value of the resulting fertilizer once it has been concentrated since the nutrient density of the harvested solids are not diminished by the presence of non-nutrient solids, all of which have been previously removed in the centrifuge 20.

Factors of importance for optimizing the efficiency of slurry separation include particle size, concentration of organic and inorganic components, and the pH and buffer systems contained in the manure. Because some portion of the elemental phosphorus may reside in the manure as suspended particulate, that portion is removed in the course of centrifugation, that phosphorus also comes out of the manure in the solid fraction. Advantageously, however, the ammonia in the manure (which is the nitrogen-bearing compound) as well as the dissolved phosphorus and the potassium that stay in solution and therefore remain in the liquid in spite of the influence of the centrifuge 20.

The solid fraction organic solids 23 emerging from the centrifuge 20 present an opportunity for economic gain for the dairyman. For example, the Cornell Waste Management Institute urges the use of dried manure solids as bedding for dairy cattle. "Cornell Waste Management Institute (CWMI) contacted the farms that had been or were starting to use DMS (dried manure solids) as bedding and conducted research on those farms to determine the feasibility of using manure solids as dairy cow bedding . . . . Using manure solids can provide an economic benefit without adversely affecting herd health." Thus, the separated organic solids 23 may be segregated for use as bedding for cattle.

Another option is to provide those organic solids 23 for gasification or for digestion. Gasification is a process that converts fibrous cell wall materials and other organic materials into carbon monoxide, hydrogen and carbon dioxide. This is achieved by reacting the material at high temperatures (>700° C.), without combustion, with a controlled amount of oxygen and/or steam. The resulting gas mixture is called syngas (from synthesis gas) or producer gas and is itself a fuel. The same fuel can be used to power, among other things, the dryers 40 referred to herein for drying manure solids.

The anaerobic digestion process occurs in two stages. The volatile solids in manure are initially broken down to a series of fatty acids. This step is called the acid-forming stage and is carried out by a particular group of bacteria, called acid formers. In the second stage, a highly specialized group of bacteria, called methane formers, convert the acids to methane gas and carbon dioxide. Methane bacteria are strict anaerobes and cannot tolerate oxygen in their environment. They function best at 95 degrees Fahrenheit; therefore to obtain maximum gas production, heat usually must be added to a digester.

Advantageously, because the solid fraction is extremely low in ammonia (the liquid fraction contains the nitrogen from the centrifuge), the solid fraction is particularly well-suited as feedstock for a digester. Under conventional processing, livestock manure contains appreciable amounts of nitrogen, which would be converted to ammonia in the digester. The ammonia in conventional processing will accumulate in the digester material and will become toxic to digesting microbes if not controlled. Ammonia toxicity is a major concern in the anaerobic digestion of livestock manure. In contrast, under centrifugation, which removes moisture along with the nitrogen from the solid fraction, the emerging solid is entirely hospitable to the microbes of the digester. To the extent that some of the nutrients do leave the centrifuge 20 in the solid fraction, either in solution in what moisture remains in the solid fraction or as nutrient particulate, the loss of these nutrients, in comparison with the nutrient content in the liquid fraction, is negligible and to some extent can facilitate decomposition of that material through either of biological digestion or gasification.

The liquid fraction from the centrifuge feeds the MVR 30. The MVR 30 allows the concentration of nutrients in one flow, termed herein "nutrient concentrate" and produces a second flow containing nearly pure water. As used herein, the MVR 30 is exploited as, essentially, an evaporative process driving off most of the water and, with it, dissolved ammonia while retaining the solid and the less volatile nutrients as a nutrient concentrate 36. Typically, an MVR 30 can concentrate manure by as much as 20:1, though more typical is 8 or 10:1. Because some of the nitrogen present leaves the MVR 30 as ammonia dissolved in water, that nitrogen can be recovered by reacting with sulfuric acid in the ammonia collection vessel 37 to produce the salt, ammonium sulphate 39.

The high nutrient content of the liquid fraction or cenrate 13 emerging from the centrifuge 20 process facilitates production of a generally more robust organic fertilizer. Nutrients exist in two forms in manure: first, the greater majority are held either in solution or as tiny particular in a colloidal suspension each being contained in the centrate 26; and second, in larger diameter particulate forms that reside in the solid fraction or organic solids 23 of the manure stream 13 entering the centrifuge 20. Because they are small and readily pass through primary separation, many of the finer particles of nutrient are traveling suspended in the liquid fraction. The centrifuge 20 turning at high speeds will readily separate the larger particles of these nutrient particles from the ammonia and other nutrients in solution, while the smaller suspended nutrient particulates remain in colloidal suspension within the liquid fraction. These particles enter the MVR 30 for evaporation along with the liquid fraction.

Figure 2:
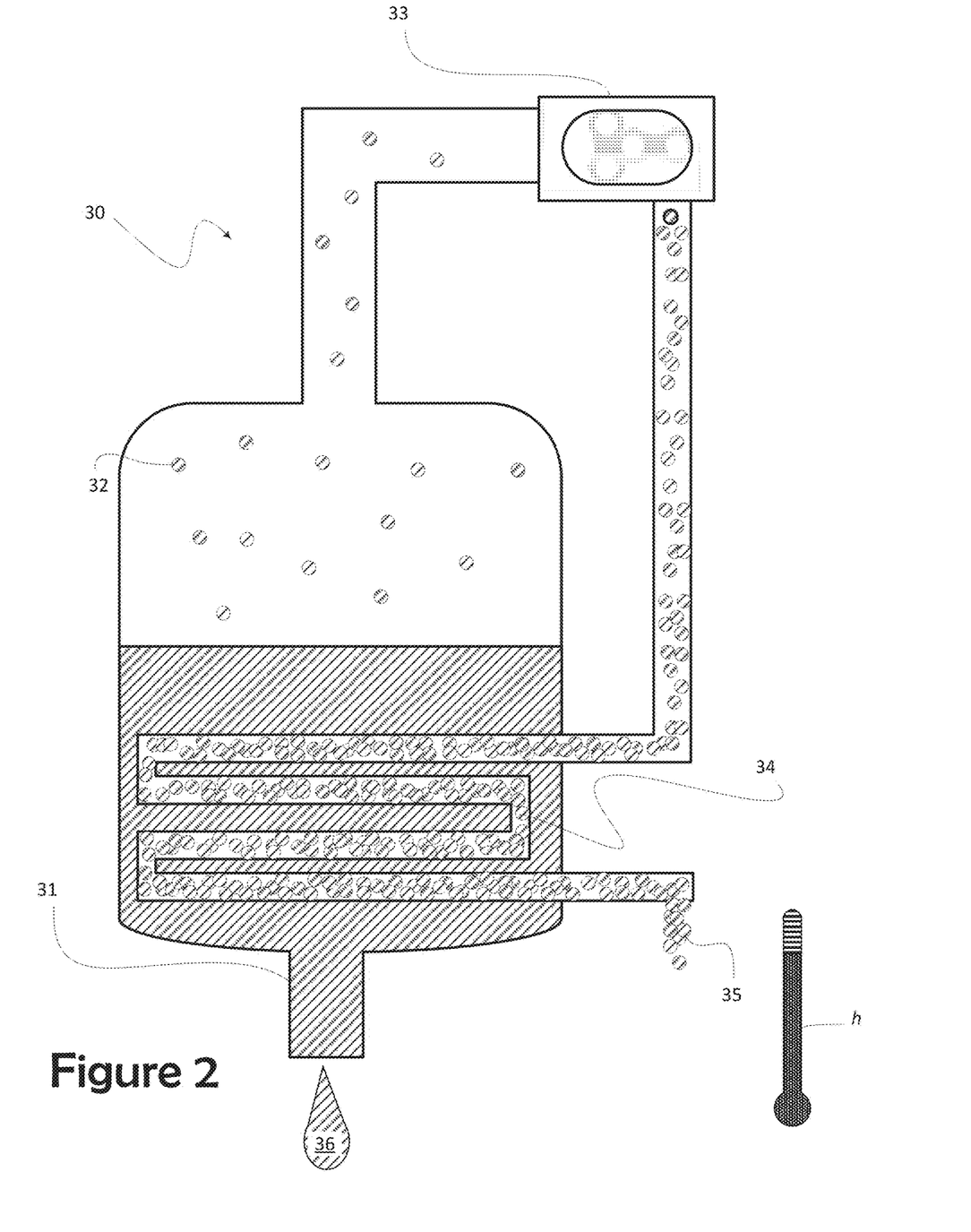
FIG. 2 is a detail depiction of the operation of a mechanical vapor recompression evaporator in the context of the system depicted in FIG. 1.

For a quick overview of evaporation, FIG. 2 presents the MVR 30. As practiced herein, the invention's mechanical vapor recompression in the MVR 30 is an energy recovery process. Liquid manure enters the MVR 30 and pools as a liquid-phase slurry 31. What water exists in the MVR feedstock 31, which, at this point, has very few solids suspended in it, is readily heated to evaporate water off as a vapor 32. Such evaporation is accelerated by heat escaping through a heat exchanger 34 from the recompressed vapor (the heat exchanger depicted as coils herein). In the presently preferred embodiment, that water vapor is produced at less than atmospheric pressure (allowing the evaporative phase change to occur at lower temperatures), driving off a significant portion of the contained water, thereby concentrating the nutrients significantly. (In a preferred embodiment, the pressure over the slurry is maintained at least 4 inches mercury (Hg) below atmospheric pressure, though a more extreme vacuum could be used successfully or might be used to initiate the process and then to run at 4 inches of Hg.) The system exploits the vapor pressure of the contained water to rapidly evaporate that contained water.

Vapor pressure or equilibrium vapor pressure is defined as the pressure exerted by a vapor in thermodynamic equilibrium with its condensed phases (solid or liquid) at a given temperature in a closed system. The equilibrium vapor pressure is an indication of a liquid's evaporation rate, in this case that of water. By confining the slurry 31 at these low pressures, the water vapor 32 readily leaves the slurry 31. The mechanical compressor 33 draws away this vapor 32 on its intake side, advantageously, maintaining the relatively low pressure (relative to the ambient) in the vessel of the MVR 30.

The vapor 32 is then compressed by a mechanical means. A compressor 33 (in a presently preferred embodiment by a roots-type compressor), by compression, adds energy to the vapor 32 and concentrates what energy the vapor 32 contains. This added energy is carried as heat h in the compressed vapor 34. The now-smaller volume of vapor, i.e. the compressed vapor 34, has been driven to a higher temperature and pressure, thus, a higher energy state. Since the pressure increase of the vapor also generates an increase in the condensation temperature, the same vapor then serves as the heating medium for its "mother" liquid, i.e. the liquid manure slurry 31 being concentrated. As described above, energy escaping the compressed vapor through the heat exchanger 34 heats the slurry 31 to liberate the vapor 32 while inside the heat exchanger 34, the liberated vapor is condensed to water and ammonia.

It is instructive to look at this transfer of energy from the compressed vapor to the slurry 31. Commonly called a heat exchanger 34, the coils that contain the compressed vapor hold that vapor 34 in thermal proximity to the slurry 31. Energy migrates as heat through the exchanger, to the mother liquid, the slurry 31. The heat exchanger 34 is a device within the MVR 30 designed to efficiently transfer or "exchange" heat from one matter to another. As a result, the heat the vapor gives off in making its phase change from gaseous to water heats the mother liquid to drive off more vapor.

Operation of the MVR 30 evaporator is that of an open heat pump system. Through compression, both pressure and temperature increase, together with the corresponding saturation temperature. The required compression energy is very small compared to the amount of latent heat present in the recycled steam. As a result, otherwise water (pure except containing dissolved ammonia gas) is evaporated off as water vapor 32 and leaves the slurry 31 to produce a highly concentrated soup of the remaining nutrients the liquid manure contained (without the nitrogen that left as ammonia gas), i.e. the nutrient concentrate 36.

To summarize the operation of the MVR 30: compression at the compressor 33 simultaneously increases both the pressure and the temperature of the vapor 34 on the downstream side, within the heat exchanger, while dropping the pressure in the vessel to hasten the escape of water from the slurry 31 as vapor 32. Heat of compression is drawn off at the heat exchanger (also termed a "condenser" when used in this manner) from the vapor 34 to facilitate condensation of the nutrient concentrate in the slurry 31. The transfer of energy from the compressed vapor 34 causes ammonia laden water vapor that evaporated out of the slurry to, then, be condensed to yield ammonia-laden water 35. In condensing, the vapor gives up heat to drive more water vapor out of its "mother fluid", the slurry 31.

Advantageously, while some heat migrating from the compressed vapor 34 through the heat exchanger heats the slurry 31, a sufficient heat h continues to reside in the ammonia-laden water 35 as it is drawn off from the MVR. This residual heat h keeps the condensate at an optimum temperature to facilitate removal of ammonia in ammonia collection vessel 37. The retention of this heat h as an elevated temperature provides a synergy with the operation of the ammonia collection vessel 37.

In the operation of the ammonia collection vessel 37, rather than allowing heated air to escape from the ammonia collection vessel 37, hot air may, optionally be retained and recycled as a closed-loop flowing within the ammonia collection vessel 37, much as a conveyor belt might move heavier objects. This recycling of air can be used to further conserve process heat. In other embodiments, an open-loop might include a heat exchanger to retain the thermal energy in the air flow as it transitions to the ambient. Also, a second heat exchanger can be employed at the exit from the MVR 30 to draw more heat from the nutrient concentrate 36 as it is drawn from the vessel. Otherwise, heat retained in the nutrient concentrate 36 simply hastens drying times. Exploiting either of these methods can be used to maintain an optimum stripping temperature, contributing to efficient operation of the ammonia collection vessel 37. Because the heat h issues from the MVR 30 with the vapor, these methods also exploit the synergy to be found in joint operation of the MVR 30 and the ammonia collection vessel 37.

Returning to FIG. 1, in the condensate 35 leaving the MVR 30 and entering the ammonia collection vessel 37, ammonium ions exist in equilibrium with ammonia gas. Ammonia exists in the condensate both as dissolved gas ($NH_3$) and in true solution as an ion ($NH_4^+$). The ammonia collection vessel 37 provides an environment in which to shift the conditions of heat, acidity, and pressure to create an selected equilibrium within the tower, an equilibrium to favor the liberation of ammonia as a gas. Thus, because the condensate 35 can be maintained at the elevated temperature leaving the MVR 30, the chemical equilibrium can be shifted to favor liberation of ammonia gas within the first of the ammonia collection vessels 37.

Two processes are used within the ammonia collection vessels 37 in the first, ammonia is stripped from the vapor and in the second, the stripped ammonia is scrubbed with a mist of sulfuric acid to segregate the nitrogen as ammonium sulfate. To contrast the processes: stripping processes are those in which a contaminated liquid stream has the contaminant removed by a gas or vapor stream; scrubbing processes are those in which a dirty vapor or gas stream has the contaminant removed by a liquid or solid media. By sequentially subjecting the vapor discharge from the MVR 30 to these two distinct processes, the system 10 moves the nitrogen from a dilute low-value form into a concentrated more valuable form.

Because there are two distinct steps, there are generally two towers used in conjunction to form the ammonia collection vessel 37. In the presently preferred embodiment, air is used much like a conveyor belt to carry ammonia gas through the stripping process. The air is forced through the first of the stripping towers to harvest the liberated ammonia gas, entraining it and carrying the ammonia gas to the second of the stripping towers where ammonia gas is removed as ammonia sulfate. Now-pure water droplets, having given up their ammonia gas, pool at the base of the first of the stripping towers. This water is, then, drawn off and is stored in a tank or reservoir such as a storage lagoon 38 (FIG. 1) for use as clean water in the dairy 12. Meanwhile, the flow of air carries the entrained ammonia gas into the second of the stripping towers for chemical reaction there, in the preferred embodiment.

The second of the stripping towers serves an absorber capturing and transforming the gaseous ammonia as ammonium sulfate. Within that second tower, ammonia gas meets a mist of sulfuric acid which, by chemical reaction, forms ammonium sulfate (a salt that is valued for use as a nitrogen-laden fertilizer). Still bearing a great deal of process heat h, with the ammonia removed, in one embodiment this flow of clean air may, optionally, be returned to the first of the stripping towers, there to entrain more ammonia gas.

Ammonia stripping occurs at the surface of droplets of the condensed water vapor 35. The surface of the condensate 35 is the interface between water and air and ammonia gas leaves through that surface. The condensate 35 is sprayed into the above-described forced air flow within the first of the stripping towers. A presently preferred embodiment of the invention, structures are placed in the first of the stripping towers to break up the condensate 35 into small droplets to enhance the volume of gas escaping. In this embodiment, the first of the ammonia stripping towers includes internal packing configured to break up the sprayed condensate 35 into fine droplets. Breaking the condensate 35 into droplets gives the ammonia more opportunities to escape per unit volume. (The smaller the droplet of water, the greater the ratio between the surface area and the volume of the droplet.)

Because the surface tension at the air-water interface is at a minimum when the water droplets or surface films are being formed; the transfer of dissolved gas from the liquid to gas entrained in the air flow is at a maximum at this instant. The greater the heat h the droplets contain, the greater the energy of the dissolved gas as it strikes the surface from the interior of the water droplet. Then, much as a rocket escapes the gravitational pull of earth, the gas molecule escapes the condensate 35 to be entrained in the air flow.

In the preferred embodiment, distinct towers are employed for the separate actions of, first, liberating the ammonia gas from the condensate and, then, transforming the ammonia gas into ammonium sulfate. Because these two actions could be performed in a single structure and because the flow of air is most advantageous when the two actions are performed in close proximity one to the other, the inventors have expressed the ammonia collection vessel 37 as a multi-chamber monolithic element of the invention even though, in the preferred embodiment, they will be configured as separate chambers. Thus, in the preferred embodiment a first and a second stripping tower, though both are, here, expressed as the ammonia collection vessel 37 are used to reclaim the ammonia from the condensate 35.

As stated above, the output of the second of the stripping towers is ammonium sulfate. The primary use of the salt ammonium sulfate is as a fertilizer for alkaline soils. Ammonium sulfate is a two-in-one fertilizer. In its crystal form with a 21-0-0 analysis, ammonium sulfate is one of agriculture's oldest solid forms of fertilizer. Ammonium sulphate is a quick acting form of water soluble nitrogen that stimulates vegetative growth and produces deep green color. In the soil, the ammonium ion is released and the sulfate ion forms a small amount of acid, lowering the pH balance of the soil, while in the same reaction, released nitrogen ions contribute essential nitrogen for plant growth.

Additionally, ammonium sulfate, as it reacts with the soil, liberates high volumes of sulfur to enhance decomposition of thatch that might reside within the soil. Sulfur available within the thatch stimulates growth of micro-organisms enhancing decomposition. Decomposition of the vegetable matter liberates other nutrients in the thatch then available to fertilize crops along with the nitrogen collected from the ammonia. This cocktail of nutrients improves color and density of the plants fertilized, for example, grasses for grazing. In addition to being nitrogen-rich, ammonia will reduce the amount of acid present in the decomposing thatch and, at a more neutral pH, enhances the action of composting organisms (referred to collectively, herein, as "aerobic thermophilic microorganisms" or "ATM") accelerating decomposition.

A low-temperature dryer 40 may, optionally, be used to make the product easier to handle. The type of dryer 40 can be selected from a number of available devices. The specific dryer 40 will be selected to use one of a variety of fuels or to exploit waste heat to perform the drying process. The dryer 40 in a preferred embodiment is a gas-powered dryer 40 where high moisture solids are drawn past radiant heaters on a motorized conveyor 42 allowing drying of the organic solids to a desired state of dryness. In a preferred embodiment, the dryer 40 will dry the solid fraction from about 70% moisture manure down to a usable range of between 0-40%.

The art of drying organic solids is known and further explanation here is not necessary to those having skills in the art.

It is important to note that as a result of the progress through the system, in addition to the distilled water (optionally stored in a lagoon 38), there are three other products the system 10 produces and the method the system employs has produced: 1) reclaimed solids 23 at a selected state of dryness, i.e. either wet or dry as needed; 2) a supply of dried nutrients; and 3) nitrogen in the form of ammonium sulfate. These three constituents can be compounded to produce superior fertilizer and suitably compounded fertilizer to meet selected analytic nutrient levels. Importantly, where in the special case of compounding organic fertilizer, however, ammonium sulphate recovered from the manure cannot be exploited to supply nitrogen to the final product as to do so would violate the regulatory standards that govern the label "organic."

Claims of organic farming must be verifiable and based on rules of the USDA National Organic Program (NOP). The NOP mandates the attributes of fertilizers they allow in the "Soil fertility and crop nutrient management practice standard," subsection 205.203 of Title 7 the Code of Federal Regulations Part 205. Commercial fertilizers can only be used if their ingredients are on the "National List of synthetic substances allowed for use in organic crop production, § 205.601" (§ 205.203). Basically, an organic grower must use soil-amendment products from these lists unless allowed by other sections of the NOP rule or otherwise approved by their certification agency. For example, the proper on-farm recycling of animal manures as a soil amendment is covered under "Soil fertility and crop nutrient management practice standard" (§ 205.203). In addition, the grower's certifying agent must approve the use of the product as part of the grower's organic system plan. Composting, grinding, extraction, mining, or various other types of processing create these materials. Even though derived from manure, the re-introduction of the ammonium sulphate salt would render the fertilizer ineligible for organic status.

Based upon duration of the interval wherein the nutrient concentrate 36 resides within the dryer, the product may be available in either of dry or wet form and according to desired fertilizer moisture levels. As discussed above, reclaimed solids 23 are may added as an amendment to improve the tilth structure of soil. Where the organic quality of the final product is not necessarily to be preserved, ammonium sulphate 39 can be readily added to the nutrient concentrate 36 to match a desired analysis. In at least one embodiment of the invention, a composting system is used both to mix these elements in selected proportions thereby to exploit these three products of the system 10 in selected proportions.

Still further fertilizer ingredients can be added to supplement a compound of any of these three ingredients. In various embodiments of the invention, by way of example, the reclaimed organic solids or, additionally, microbes such as aerobic thermophilic microorganisms ("ATM") may be added to the mixture to augment the nutrient concentrate, thereby to produce various fertilizers in distinct formulations. (Microorganisms such as bacteria, fungi, and actinomycetes account for most of the decomposition that takes place in composting organic solids in a pile. They are considered chemical decomposers, because they change the chemistry of organic wastes.) Because such additives can be selectively incorporated into the mixture that, when fully compounded, results in a custom-compounded fertilizer. Importantly, as noted above, the combinations of these three can be varied, even to the exclusion of one or another in order to provide distinct products. By varying proportions of the constituents, the system will produce distinct products which can be readily predicted based upon ingredients and identified as specific soil amendments as needed.

Drying and sorting of resulting product as distinct types of fertilizer may be desirable for transportation of resulting fertilizer. The drying of the product makes its handling and storage easier. By knowing the precise formulation of nutrients and such microbes as may be introduced into the mixture, the resulting product is readily categorized. Generally speaking, the agricultural industry has channeled its demand for fertilizer into two levels of dryness described generally as "moist" and "dry." Moist fertilizer has a solids content ranging from 40-70% and may be alternately described as "high moisture content" fertilizer. A second category is referred to as "dry" and is generally categorized as about 85% solids or greater.

Moist fertilizer is preferred when the product is to be used near the dairy. The benefits of drying manure include imparting a greater ease in handling and transportation of the resulting fertilizer. However, because of nutrient volatilization under heat and the cost of energy to run a dryer, the moist fertilizer is generally economically desirable over dry fertilizer where transportation is minimal or storage is not required. As transportation costs mount or where extended storage is desired, for example, for sites further removed from the dairy, the slight degradation of nutrients due to drying is not a significant enough factor to overwhelm the ease of handling or transportation. Thus, state of dryness is selected to meet the needs of the ultimate user. In accord with the customs of the industry, product is sorted to either of a dry moisture sort or a high moisture sort. Because manure is a necessary by-product of the dairy operation, the use of the system facilitates the dairyman's economic exploitation of these manure by-products.

Further exploitation of the system is possible. Disposing of excess organic material, where necessary can be achieved by, for example, digestion of those organic solids. Using the centrifuge 20 prior to feeding a digester allows the concentration of solids to be decomposed within the digester. The digestion process begins with bacterial hydrolysis of the organic material. Insoluble organic polymers, such as carbohydrates, are broken down to soluble derivatives that become available for other bacteria. Acidogenic bacteria then convert the sugars and amino acids into carbon dioxide, hydrogen, ammonia, and organic acids. These bacteria convert these resulting organic acids into acetic acid, along with additional ammonia, hydrogen, and carbon dioxide. Finally, methanogens convert these products to methane and carbon dioxide.

The process produces a biogas, consisting of methane, carbon dioxide, and traces of other 'contaminant' gases. The produced biogas can be used directly as fuel, in combined heat and power gas engines or upgraded to natural gas-quality biomethane. So produced, the methane can, for example, power an internal combustion engine driving a generator to augment the power supplied to the dairy resulting in savings. Additionally, microbes or ATM may be harvested for augmenting fertilizers to aid in the decomposition of thatch in soils.

While the preferred embodiment of the invention has been illustrated and described, as noted above, many changes can be made without departing from the spirit and scope of the invention. Accordingly, the scope of the invention is not limited by the disclosure of the preferred embodiment.

Instead, the invention should be determined entirely by reference to the claims that follow.

The embodiments of the invention in which an exclusive property or privilege is claimed are defined as follows:

1. A method for reclaiming nutrients from dairy manure, the nutrients for use in compounding fertilizer, comprising:
    separating by centrifugation a liquid fraction of the manure from a solid fraction comprising organic material;
    evaporating the liquid fraction by mechanical vapor recompression to produce ammonia-laden water vapor and a concentrated nutrient slurry; and
    drying the nutrient slurry to a selected moisture content to be available as an ingredient in compounded fertilizer.

2. The method of claim 1 further comprising receiving the dried nutrient slurry in a composter.

3. The method of claim 1, wherein centrifugation occurs within a decanter-type centrifuge.

4. The method of claim 1, wherein the centrifugation occurs at between 2000 G and 2400 G.

5. The method of claim 1 wherein mechanical vapor recompression occurs within a mechanical vapor recompression evaporator in which the pressure over the concentrated nutrient slurry is maintained at least 4 inches mercury (Hg) below an ambient atmospheric pressure.

6. The method of claim 1 wherein the compression is by root-type compressor.

7. The method of claim 1 wherein the solid fraction comprises feedstock for an anaerobic digester.

8. A method for isolating components of dairy manure, the isolated components to include nitrogen, water, condensed nutrient slurry and organic matter, the method comprising:
    receiving dairy manure in a centrifuge;
    operating the centrifuge to separate the received dairy manure into a solid fraction comprising the organic matter and liquid fraction; and
    receiving the liquid fraction in a mechanical vapor recompression evaporator ("MVR") from the centrifuge and in its operation evaporating an ammonia-laden water vapor from a condensed nutrient slurry.

9. The method of claim 8, further comprising:
    receiving the condensed nutrient slurry from the MVR in a dryer; and
    drying the condensed nutrient slurry to a selected moisture content.

10. The method of claim 8, further comprising:
    receiving the condensed nutrient slurry and aerobic thermophilic microorganisms in a mixer wherein the condensed nutrient slurry and aerobic thermophilic microorganisms are mixed to form a soil tilth additive.

11. The method of claim 8, further comprising:
    receiving the organic matter from the centrifuge in a digester to receive and to produce products comprising methane gas for combustion.

12. A method for reclaiming nutrients from dairy manure, the nutrients for use in compounding fertilizer, comprising:
    separating a liquid fraction of the manure from a solid fraction comprising organic material in a centrifuge;
    receiving the liquid fraction from the centrifuge and evaporating the liquid fraction in a mechanical vapor recompression evaporator ("MVR") by mechanical vapor recompression to produce ammonia-laden water vapor and a concentrated nutrient slurry; and
    drying the nutrient slurry to a selected moisture content to be available as an ingredient in compounded fertilizer.

13. The method of claim 12, wherein the centrifuge includes a decanter-type centrifuge.

14. The method of claim 12, wherein the separating a liquid fraction of the manure from a solid fraction comprising organic material in a centrifuge occurs at between 2000 G and 2400 G.

15. The method of claim 12 wherein receiving the liquid fraction from the centrifuge and evaporating the liquid fraction in a mechanical vapor recompression evaporator occurs at a pressure over the concentrated nutrient slurry which is at least 4 inches mercury (Hg) below an ambient atmospheric pressure.

16. The method of claim 12, further comprising:
    drying the condensed nutrient slurry received from the MVR to a selected moisture content.

17. The method of claim 12, further comprising receiving the dried nutrient slurry in a composter.

18. The method of claim 17, wherein receiving the dried nutrient slurry in a composter further comprises:
    mixing the nutrient slurry in a mixer wherein the condensed nutrient slurry and aerobic thermophilic microorganisms are mixed to form a soil tilth additive for receiving in the composter.

19. The method of claim 12, further comprising:
    digesting the organic matter from the centrifuge to produce products comprising methane gas for combustion.

* * * * *